(12) United States Patent
Regan et al.

(10) Patent No.: US 7,865,576 B2
(45) Date of Patent: Jan. 4, 2011

(54) CHANGE OF SUBSCRIBER INFORMATION IN A MULTI-CHASSIS NETWORK ACCESS ENVIRONMENT

(75) Inventors: Joseph M. Regan, Pleasanton, CA (US); Ron E. Haberman, San Jose, CA (US); Miroslav Vrana, Zumikon (CH); Hamdy Farid, Kanata (CA); Fernando Cuervo, Ottawa (CA)

(73) Assignee: Alcatel Lucent, Paris (FR)

( * ) Notice: Subject to any disclaimer, the term of this patent is extended or adjusted under 35 U.S.C. 154(b) by 476 days.

(21) Appl. No.: 11/712,577

(22) Filed: Feb. 27, 2007

(65) Prior Publication Data
US 2008/0183769 A1    Jul. 31, 2008

Related U.S. Application Data

(60) Provisional application No. 60/898,796, filed on Jan. 31, 2007.

(51) Int. Cl.
G06F 15/16 (2006.01)
G06F 15/177 (2006.01)
G06F 15/173 (2006.01)

(52) U.S. Cl. .................. 709/219; 709/221; 709/242; 709/248

(58) Field of Classification Search .......... 707/201; 709/223, 226
See application file for complete search history.

(56) References Cited

U.S. PATENT DOCUMENTS

| | | | | |
|---|---|---|---|---|
| 4,926,495 | A * | 5/1990 | Comroe et al. | 455/508 |
| 5,442,783 | A * | 8/1995 | Oswald et al. | 1/1 |
| 6,154,776 | A * | 11/2000 | Martin | 709/226 |
| 7,042,876 | B1 * | 5/2006 | Jayasenan et al. | 370/389 |
| 7,139,926 | B1 * | 11/2006 | Madhav et al. | 714/4 |
| 7,227,838 | B1 * | 6/2007 | O'Riordan | 370/219 |
| 7,266,112 | B1 * | 9/2007 | Law et al. | 370/352 |
| 7,280,557 | B1 * | 10/2007 | Biswas et al. | 370/465 |
| 7,290,015 | B1 * | 10/2007 | Singhal et al. | 1/1 |
| 2001/0007123 | A1 * | 7/2001 | Seguchi | 711/162 |
| 2001/0043568 | A1 * | 11/2001 | McHale et al. | 370/401 |
| 2002/0009078 | A1 * | 1/2002 | Wilson et al. | 370/389 |
| 2002/0052931 | A1 * | 5/2002 | Peiffer et al. | 709/218 |
| 2003/0065812 | A1 * | 4/2003 | Beier et al. | 709/236 |
| 2004/0039756 | A1 * | 2/2004 | Bromley | 707/200 |
| 2005/0138084 | A1 * | 6/2005 | Azagury et al. | 707/200 |
| 2005/0281194 | A1 | 12/2005 | Sonoda | |
| 2005/0289386 | A1 * | 12/2005 | Tawil et al. | 714/6 |
| 2006/0015537 | A1 * | 1/2006 | Marks | 707/200 |

(Continued)

OTHER PUBLICATIONS

Cisco AS5200 Universal Access Server—Quick Start Guide, 1998-1999.*

(Continued)

*Primary Examiner*—Saleh Najjar
*Assistant Examiner*—Robert Shaw
(74) *Attorney, Agent, or Firm*—Van Pelt, Yi & James, LLP

(57) ABSTRACT

Managing subscriber host information is disclosed. A new or updated information about a subscriber host is received. It is determined whether the subscriber host is associated with a multi-chassis peering. If it is determined that the subscriber host is associated with a multi-chassis peering, the new or updated information is propagated to a peer chassis associated with the multi-chassis peering.

14 Claims, 6 Drawing Sheets

U.S. PATENT DOCUMENTS

| | | |
|---|---|---|
| 2006/0059478 A1 | 3/2006 | Krajewski, III |
| 2006/0245439 A1* | 11/2006 | Sajassi .................. 370/400 |
| 2006/0291378 A1* | 12/2006 | Brotherston et al. ........ 370/221 |
| 2007/0005968 A1* | 1/2007 | Lu et al. .................. 713/168 |
| 2007/0061433 A1* | 3/2007 | Reynolds et al. ............ 709/223 |
| 2007/0076607 A1* | 4/2007 | Voit et al. .................. 370/230 |
| 2007/0076691 A1* | 4/2007 | Varney et al. ............... 370/352 |
| 2007/0123253 A1* | 5/2007 | Simongini et al. .......... 455/433 |
| 2007/0165622 A1* | 7/2007 | O'Rourke et al. ........... 370/389 |
| 2007/0203999 A1* | 8/2007 | Townsley et al. ............ 709/207 |
| 2008/0062999 A1* | 3/2008 | Platnic ...................... 370/401 |
| 2008/0267199 A1* | 10/2008 | Smith et al. ................. 370/401 |

OTHER PUBLICATIONS

Catalyst 1900 Series and Catalyst 2820 Series Enterprise Edition Software Configuration Guide, 1999.*

Using the Catalyst 1900 Series Telco Mounting Brackets, Jun. 4, 1999.*

Li et al. Cisco Hot Standby Router Protocol (HSRP) RFC 2281, Mar. 1998.*

D. Gan & P. Srisuresh, Load Sharing using IP Network Address Translation (LSNAT), RFC 2391, Aug. 1998.*

Ehternet/IP, Recommended Operation for Switches Running Relay Agent and Option 82 (ODVA_DHCP_Option82v2), Sep. 7, 2004.*

Modem Pooling for the Cisco AS5200, Cisco IOS 11.2, 1998.*

* cited by examiner

CHANGE OF SUBSCRIBER INFORMATION IN A MULTI-CHASSIS NETWORK ACCESS ENVIRONMENT

CROSS REFERENCE TO OTHER APPLICATIONS

This application claims priority to U.S. Provisional Patent Application No. 60/898,796 entitled CHANGE OF SUBSCRIBER INFORMATION IN A MULTI-CHASSIS NETWORK ACCESS ENVIRONMENT, filed Jan. 31, 2007 which is incorporated herein by reference for all purposes.

BACKGROUND OF THE INVENTION

In an environment in which a subscriber host and/or an access node, such as a digital subscriber line access multiplexer (DSLAM) associated therewith, has access to a provider network via two or more chassis, a need exists to ensure that changes to subscriber host information, such as a change of authorization or other change in network service parameters, are propagated to each of the two or more chassis, e.g., so that at any given time, and without delay, a formerly backup chassis can begin to serve as an active chassis with respect to the subscriber host. A way is needed to ensure such information is propagated without requiring the RADIUS server or other subscriber information repository to associate multiple chassis with a subscriber host and/or send to multiple chassis changes to subscriber information.

BRIEF DESCRIPTION OF THE DRAWINGS

Various embodiments of the invention are disclosed in the following detailed description and the accompanying drawings.

DETAILED DESCRIPTION

Figure 1:
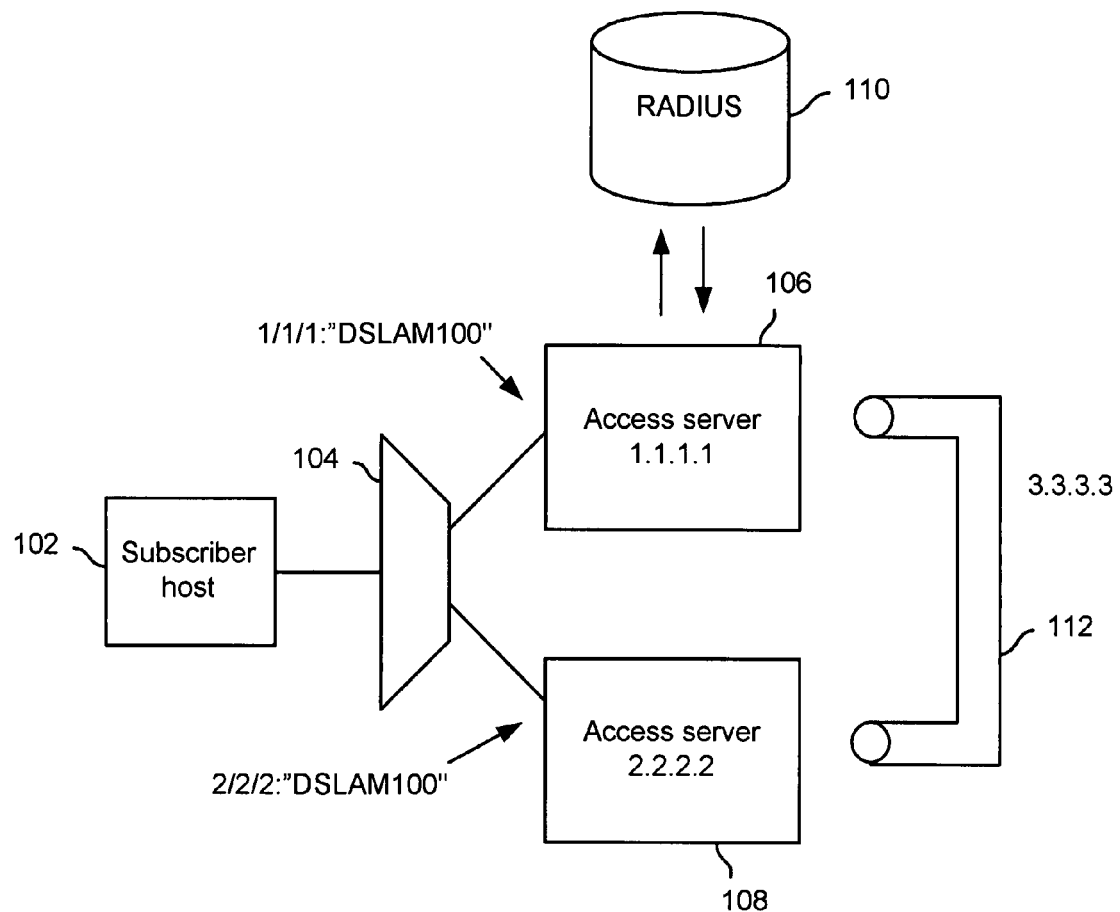
FIG. 1 is a block diagram illustrating an embodiment of a system for providing access to a provider network.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing a change in subscriber information in a multi-chassis network access environment is disclosed. A new or updated information about a subscriber host is received. If the subscriber host is associated with a multi-chassis peering, the new or updated information is propagated to a peer associated with the multi-chassis peering.

Typically, when a subscriber hosts begins to access network services via a provider network, a determination is made as to which service(s) the subscriber host is entitled to access, what level of service the subscriber host has contracted to receive, whether the subscriber's account is current, etc. Such subscriber information may be determined, for example, by a provider network equipment, such as a provider edge switch or router (referred to generically sometimes herein as an "access server"), for example by consulting a RADIUS server or other repository of subscriber information. In some embodiments, data extracted from DHCP lease communications monitored at the access server is used to determine the identify of a subscriber host and associate the subscriber host with subscriber host information stored at the access server, such as an ingress port with which the subscriber host is associated, an IP address the subscriber host is assigned to use, a DHCP lease term and/or expiration time, an identification of types and/or levels of service, etc.

A RADIUS server or other external repository of subscriber information, upon receiving a change to a subscriber's information, typically is configured to propagate such changes to the access server that requested the subscriber host's information when the subscriber host first connected. For example, a need may arise to change a subscriber host's information mid-session, i.e., not at or before a time when a change of authorization or other DHCP event is occurring (e.g., subscriber failed to pay bill or hit "turbo" button to request faster or higher priority service). In such a situation, the RADIUS server or other subscriber information repository, unless specially configured to inform both access servers (active and standby, for example) that the subscriber host's information has changed, typically would inform only the access server through which the subscriber host first connected, e.g., an access server via which the subscriber host first obtained its IP address. However, in the multi-chassis setting a second (formerly backup) access server may have become or may in the future become the active server handling the subscriber host's traffic, and as a result may need to be informed of the change of subscriber information.

In some embodiments, to facilitate propagation of changes to subscriber host information, access servers through which a subscriber host may be provided access use the same tag string to identify the port with which the subscriber host is associated (e.g., "DSLAM100"). This ingress port tag becomes part of the RADIUS (or other) key used to access and/or update subscriber host information and enables either access server to communicate with the RADIUS server about the host. Also, a multi-chassis synchronization (MCS) peering is defined between the chassis. For example, in some embodiments a peering associating the respective DHCP proxies on each access server is defined and is used to propagate subscriber host information sent by a RADIUS server or other repository to one of the access servers in the peering (typically the one through which the subscriber host first connected).

FIG. 1 is a block diagram illustrating an embodiment of a system for providing access to a provider network. In the example shown, a subscriber host accesses network services via a DSLAM 104. The DSLAM 104 has connectivity to a provider network (not shown) via a first access server 106 and a second access server 108. In some embodiments, at any given time one or the other of the access servers 106 and 108 is in an active state with respect to traffic associated with DSLAM 104 and the other is in a backup state. In the example shown, for example, at a time when the subscriber host 102 first establishes a connection to the provider network the DSLAM 104 is being served actively by the access server 106 with access server 108 in standby. The access server 106 monitors DHCP lease communications between subscriber host 102 and a DHCP server (not shown in FIG. 1) and uses information extracted from such communications to retrieve from a RADIUS server 110 subscriber information associated with subscriber host 102, e.g., an indication of whether the subscriber host 102 is authorization to access the provider network, which service(s) it is permitted to access and at what levels of service, etc.

In the example shown, access servers 106 and 108 both use the same tag string to identify the port with which the subscriber host 102 (and in various embodiments other hosts associated with DSLAM 104) is associated, i.e., "DSLAM100" in this example. This ingress port tag becomes part of the RADIUS (or other) key used to access and/or update subscriber information about the subscriber host 102 and enables either access server to communicate with the RADIUS server about the host. Also, a multi-chassis synchronization (MCS) peering is defined and an associated inter-chassis connection 112 is used to share host information sent by the RADIUS server to one of the access servers (typically the one through which the subscriber host first connected).

An IP address (3.3.3.3 in the example above) is assigned to the peering and is used, instead of the actual chassis-specific IP address of each proxy, by a host accessing the network via either proxy. MCS in some embodiments provides a mechanism by which subscriber host information updates made to one proxy in a peering are propagated to the other, so regardless of which is master and which backup, both have the latest information and the radius server need only inform one of them directly of any changes. For example, when access server 1.1.1.1 is active and subscriber management is enabled, information received from the RADIUS server about the subscriber host 102 would be associated with the MCS associated with IP address 3.3.3.3 and propagated to access server 2.2.2.2 via the MCS connection 112.

Figure 2:
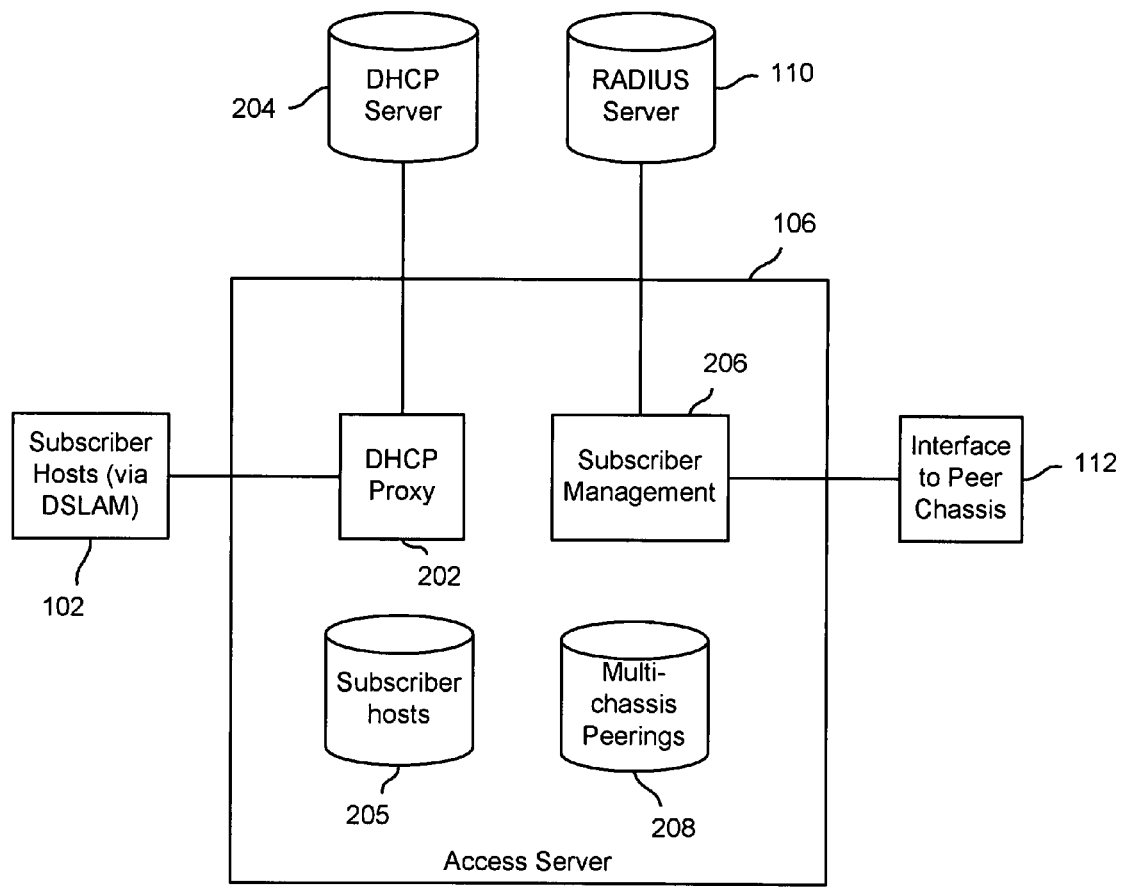
FIG. 2 is a block diagram illustrating an embodiment of a system for propagating subscriber host information to a peer chassis.

FIG. 2 is a block diagram illustrating an embodiment of a system for propagating subscriber host information to a peer chassis. In the example shown, the access server 106 is shown to include a DHCP proxy 202 configured to monitor DHCP lease communications between the subscriber host 102 and a DHCP server 204 and extract from such communications, e.g., from "option 82" or other information in a DHCP lease acceptance acknowledgement (ACK) or other communication, and store in a subscriber host data store 205 information such as an identification of the DSLAM or other node via which the subscriber host 102 has access and the IP address leased to the subscriber host 102 and the associated term and/or expiration. A subscriber management application, module, or other process or component 206 subscriber host information extracted from the DHCP lease communications, and/or data determined using such information, to retrieve from a RADIUS server 110 further information associated with the subscriber host 102, such as which network service (s) the subscriber host 102 is allowed to access, a contracted for level of service with respect to each, etc.

The subscriber management module 206 is further configured to determine, e.g., based on information associated with the subscriber host 102 and/or the port being used by subscriber host 102 and/or a DSLAM or other access node via which it is communicating with the access server 106, whether the subscriber host 102 and/or associated DSLAM are connected to multiple access servers, e.g., as shown in FIG. 1. In some embodiments, the determination is based at least in part on a "q tag" or other tag used by the subscriber host 102 and/or an associated DSLAM or other access node to exchange with the access server 106 traffic associated with the subscriber host 102, such as determining whether the "q tag" or other identifier associated with a port of circuit with which the subscriber host is associated is associated with a multi-chassis peering. In some embodiments, the tag comprises a string associated with the DSLAM and/or a service provided via and/or subscriber serviced by the DSLAM, such as "DSLAM100" in the example shown in FIG. 1. The tag is part of the key used to access and retrieve information from the RADIUS server, and the RADIUS server returns information indicating the multi-chassis peering. In some embodiments, a table store locally at the access server 106 is used to determine that the tag is associated with a multi-chassis peering. If it is determined, e.g., by the subscriber management module 206, that the subscriber host 102 is associated with a multi-chassis peering, data reflecting that association is stored in a multi-chassis peering store 208. If it has not already been established, a communication path 112 to the peer chassis is established and associated with the peering, including in the example shown by associating with the peering a peering-specific IP address, e.g., the illustrative address "3.3.3.3" in the example shown in FIG. 1. In some embodiments, a separate communication path and associated IP address is established for each peering. For example, if a chassis "A" has a first peering with chassis "B" with respect to a DSLAM "100" and a second peering with a chassis "C" with respect to a DSLAM "200", the chassis "A" would establish a first communication path to chassis "B" and associate a first peering-specific IP address with the first path, and would establish a second communication path to chassis "C" and associate a second peering-specific IP address with the second path. In some embodiments, assigning a peering-specific IP address with each peering, and having a separate communication path to each peer, simplifies the implementation of a policy manager application or process required to share information between peer chassis as described herein.

The initial subscriber host information stored in subscriber host store 205 is sent to the peer chassis via the communication path 112. Thereafter, if any changes to the subscriber host information associated with subscriber host 102 are received or otherwise determined, e.g., from the RADIUS server 110, such changes are propagated to the peer chassis via the communication path 112. In some embodiments, changes to the subscriber host information for subscriber host 102 may continue to be received by the access server 106 even after the access server has entered a standby (or unavailable) state with respect to the subscriber host 102 and/or a DSLAM via which the subscriber host is connected to the access server 106, for example after a failover or controlled switchover to peer chassis 108 being active. Using the techniques described herein, the peer chassis 108 would have current and complete subscriber host information for the subscriber host 102 and the time of failover/switchover, and would continue to receive and changes, via the multi-chassis synchronization described above, even if the RADIUS server 110 and/or other source(s) of such changed information only sent the information directly to the access server 106, even though it was no longer the active server for that subscriber host.

Figure 3:
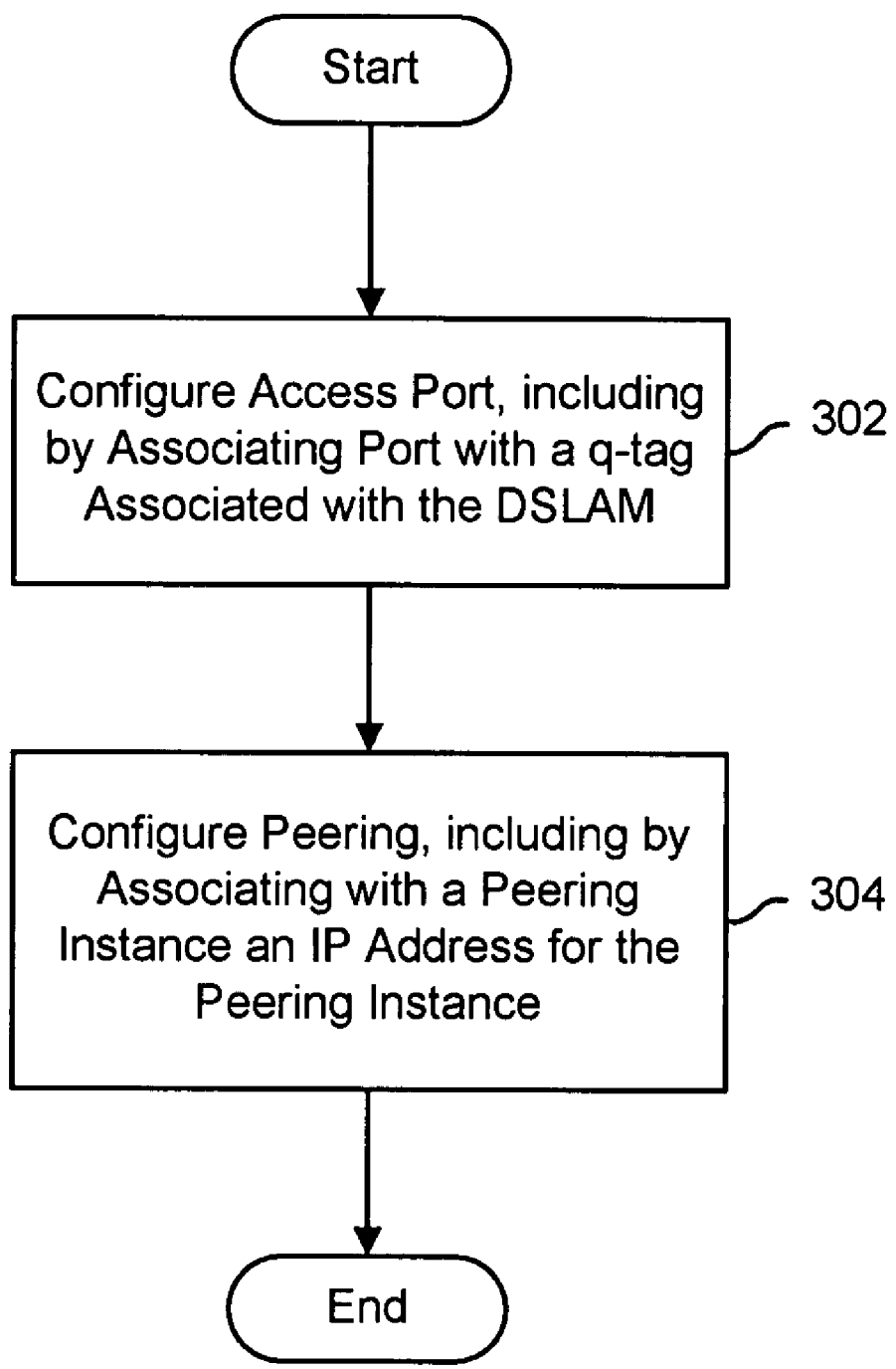
FIG. 3 is a flow chart illustrating an embodiment of a process for synchronizing subscriber host information across multiple chassis.

FIG. 3 is a flow chart illustrating an embodiment of a process for synchronizing subscriber host information across multiple chassis. In the example shown, an access port is configure to serve the subscriber host, an associated set of subscriber hosts, and/or a DSLAM or other access node configured to provide access to one or more subscriber hosts (302). A "q tag" or other tag or identifier is associated with the access port and an associated multi-chassis peering. In some embodiments, the same tag or other identifier is used on each of the chassis in a peering, e.g., the tag "DSLAM100" in the example shown in FIG. 1. The common tag or other identifier in some embodiments is used to facilitate sharing of information between peers. In some embodiments, the respective chassis use different q tags and another local tag common to both/all chassis is associated at each respective chassis with the local q tag to which it corresponds. A peering instance is configured, including by establishing a peering-specific IP or other communication path between the peers and associating with the peering-specific communication path and IP (or other) address specific to the peering (304). In some embodiments, the process of FIG. 3 is performed in connection with provisioning the respective chassis in the peering to provide network access to the subscriber host(s) and/or access node(s) associated with the peering.

Figure 4:
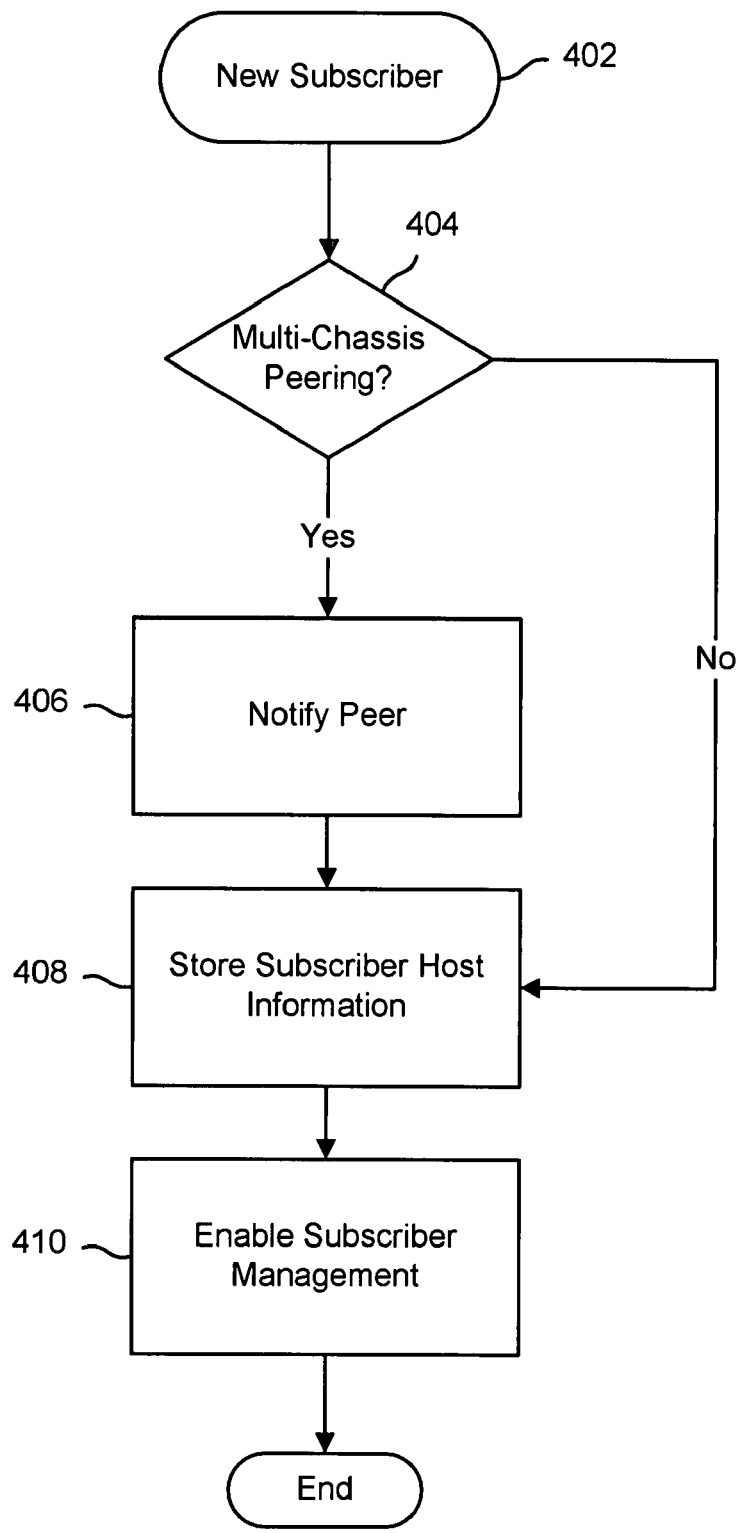
FIG. 4 is a flow chart illustrating an embodiment of a process for determining and handling initial information about a newly-connected subscriber.

FIG. 4 is a flow chart illustrating an embodiment of a process for determining and handling initial information about a newly-connected subscriber. In the example shown, a new subscriber is identified and associated information determined (402). For example, DHCP lease communications are monitored and new subscriber host information determined from such communications and/or an external repository, such as a RADIUS server. It is determined whether the subscriber host is associated with a multi-chassis peering (404). In various embodiments, the determination as to whether the subscriber host is associated with a multi-chassis peering is based at least in part on a q tag or other identifier associated with the subscriber host and/or other information associated with the subscriber host. If the new subscriber is associated with a multi-chassis peering (404), initial subscriber host information is sent to the peer (406) and stored locally (408), e.g., in a subscriber host information data store such as data store 205 in FIG. 2. If the subscriber host is not associated with a multi-chassis peering (404) the initial subscriber host information is stored locally (408). In either event, subscriber management is enabled with respect to the subscriber (410). In some embodiments, subscriber management includes processing (and if applicable propagating to peers) updates to a subscriber host's information. In some embodiments, a chassis that receives subscriber host information from a peer, as opposed to determining such information directly from monitored DHCP lease communications and/or through direct communication with a RADIUS server and/or other repository, does not enable subscriber management with respect to such a subscriber host, and as a result does not assume responsibility for propagating changes to peers.

Figure 5:
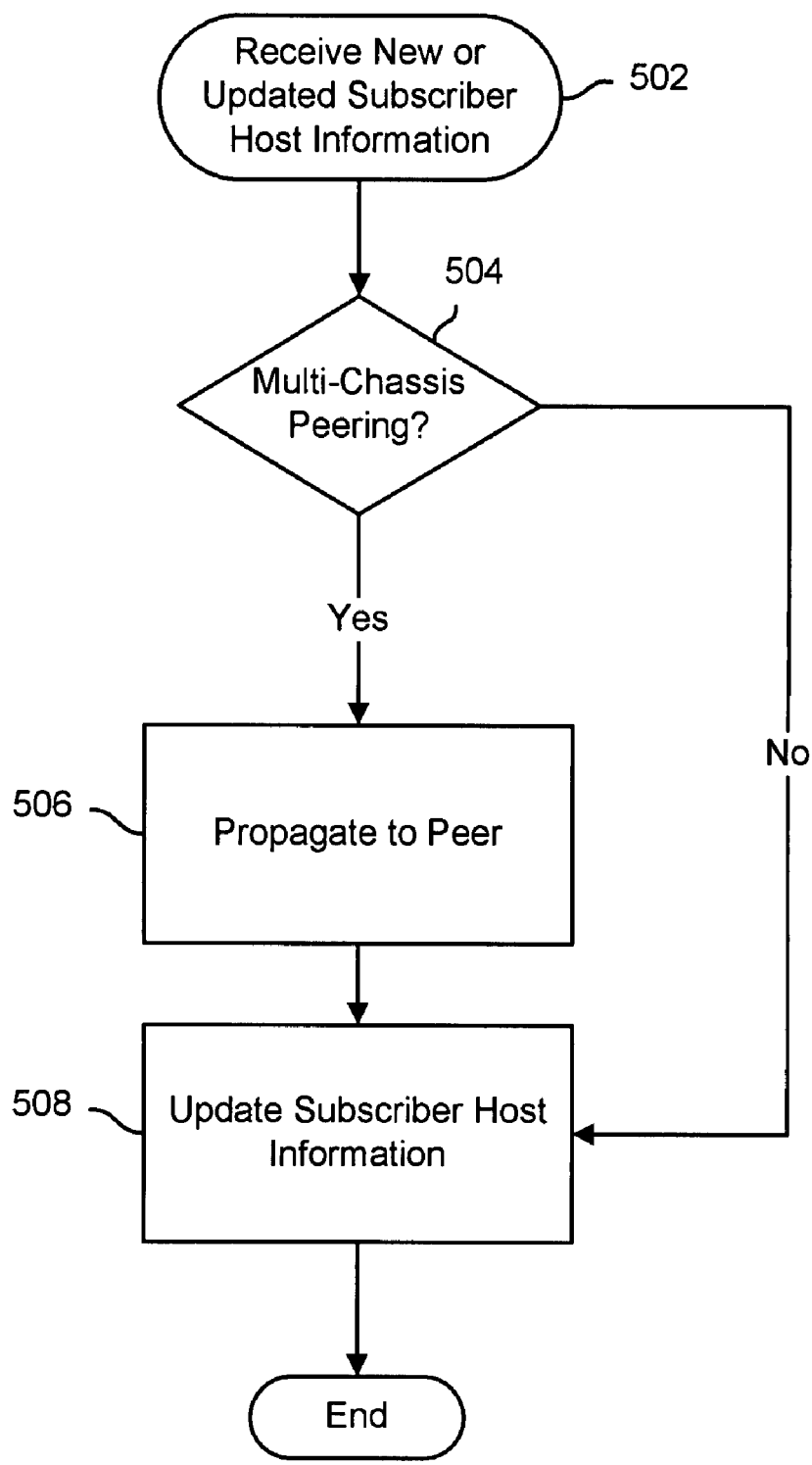
FIG. 5 is a flow chart illustrating an embodiment of a process for processing updates to subscriber host information.

FIG. 5 is a flow chart illustrating an embodiment of a process for processing updates to subscriber host information. In the example shown, new or updated subscriber host information is received for a subscriber host for which at least initial subscriber host information has been received and/or stored previously (502). It is determined whether the subscriber host is associated with a multi-chassis peering (504). If the subscriber host is associated with a multi-chassis peering (504), the received new or updated subscriber host information is propagate to the peer chassis included in the peering (506). In either event (504), the local subscriber host information data store is updated to reflect the new or updated information (508).

Figure 6:
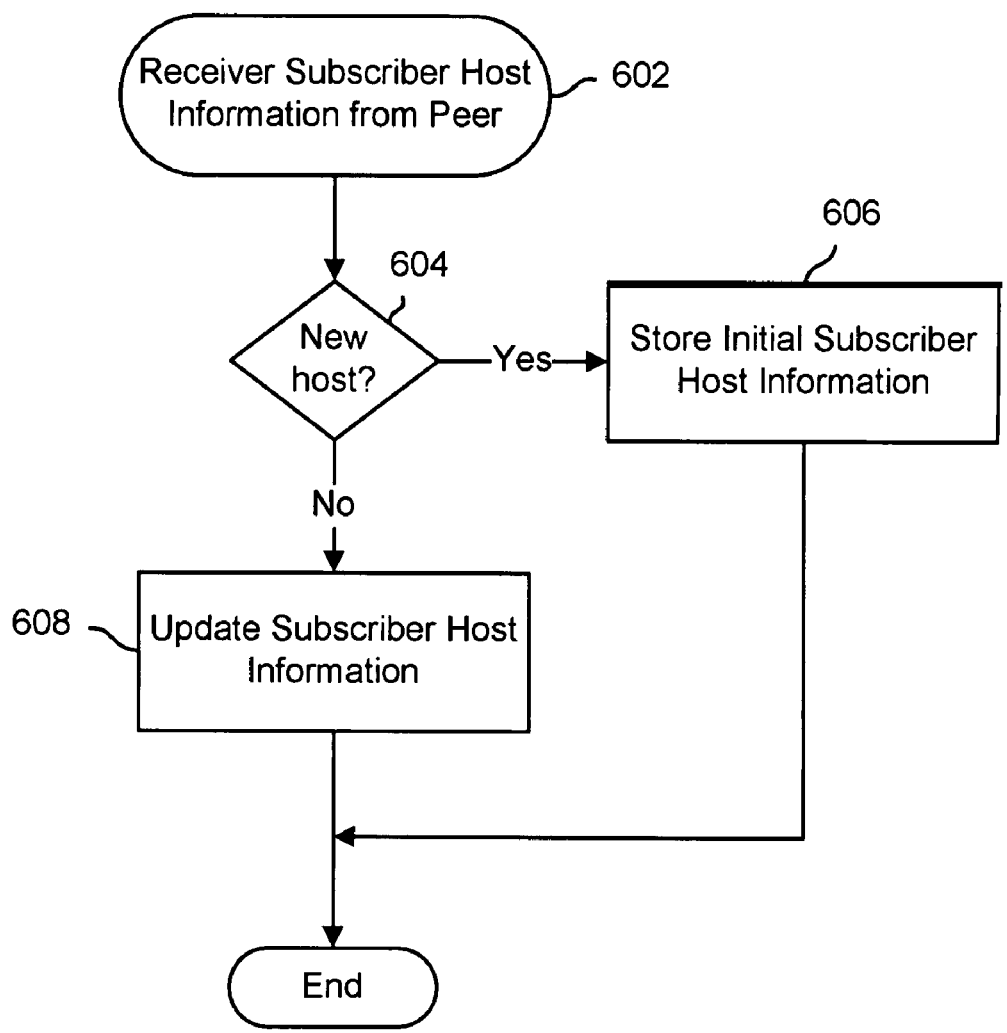
FIG. 6 is a flow chart illustrating an embodiment of a process for processing subscriber host information received from a peer chassis.

FIG. 6 is a flow chart illustrating an embodiment of a process for processing subscriber host information received from a peer chassis. In the example shown, subscriber host information is received from a peer chassis (602). In some embodiments, subscriber host information is determined to have been received from a peer chassis if the information is received via a communication path associated with a multi-chassis peering, such as communication path 112 in the example shown in FIG. 1. If the subscriber host is a new host (i.e., no prior information has been received about the host) (604), a subscriber host record is established for the subscriber host and the initial subscriber host information is stored (606). In some embodiments, the initial information includes data associating the subscriber host with the multi-chassis peering. If the subscriber host is not a new host (604), the received information is used to update the existing subscriber host information record associated with the subscriber host (608).

Using techniques described herein, subscriber host information can be synchronized among multiple chassis, enabling each to be in a position to provide access to the subscriber host (e.g., be in an "active" state with respect to the subscriber host), without requiring that a RADIUS server or other repository of subscriber host information be provisioned and/or otherwise configured to know about multi-chassis peerings and/or to propagate to multiple chassis changes to subscriber host information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing subscriber host information, comprising:

receiving, at a first access server, a new or updated information about a subscriber host; determining whether the subscriber host is associated with a multi-chassis peering including multiple peer access servers each configured to provide the subscriber host access to network service(s);

and in the event it is determined that the subscriber host is associated with a multi-chassis peering including multiple peer access servers each configured to provide the subscriber host access to network service(s), configuring the first peer chassis access server with a tag or other identifier associated with the multi-chassis peering to associate with a communication port with which the subscriber host is associated and propagating the new or updated information about the subscriber host to a peer chassis access server of the first access server associated with the multi-chassis peering,
wherein said subscriber host information is propagated to said peer chassis access server via a communication path associated with said multi-chassis peering, wherein said communication path has associated with it an IP or other address specific to the multi-chassis peering;
wherein said step of propagating the new or updated information about the subscriber host to a peer chassis access server is not performed if the new or updated information with respect to the subscriber host is received from a peer chassis access server of the multi-chassis peering.

2. The method of claim 1, wherein receiving a new or updated information about a subscriber host comprises extracting information from a monitored DHCP lease communication.

3. The method of claim 1, wherein receiving a new or updated information about a subscriber host comprises retrieving information from a RADIUS server or other external repository of subscriber host information.

4. The method of claim 1, further comprising enabling a subscriber management functionality with respect to said subscriber host.

5. The method of claim 1, wherein the new or updated information indicates a change of authorization with respect to the subscriber host.

6. The method of claim 1, wherein the new or updated information indicates a change in a service level to be provided with respect to tile subscriber host.

7. The method of claim 1, wherein the multi-chassis peering is one of a plurality of multi-chassis peerings, each associated with different set of one or more peer access server.

8. The method of claim 7, wherein a separate peering-specific communication path is associated with each of at least a subset of said plurality of multi-chassis peerings.

9. The method of claim 1, further comprising receiving an indication to transition from an active state to a standby state with respect to the subscriber host.

10. The method of claim 9, further comprising continuing to propagate to said peer access server, while in the standby state, new or updated subscriber host information received subsequent to entering the standby state, in the event it is determined that the subscriber host is associated with the multi-chassis peering;
wherein the subscriber host is determined to be associated with the multi-chassis peering if the "q tag" or other identifier associated with a port or circuit with which the subscriber host is associated is determined to be associated with the multi-chassis peering.

11. A network provider equipment, comprising:
an inter-chassis communication interface; and a processor coupled to the inter-chassis communication interface and configured to:
receive, at a first access server, a new or updated information about a subscriber host;
determine whether the subscriber host is associated with a multi-chassis peering; and in the event it is determined that the subscriber host is associated with a multi-chassis peering including multiple peer access servers each configured to provide the subscriber host access to network service(s), configuring the first peer chassis access server with a tag or other identifier associated with the multi-chassis peering to associate with a communication port with which the subscriber host is associated, and propagate to a peer server of the first access server associated with the multi-chassis peering, via the inter-chassis communication interface, the new or updated information;
wherein said subscriber host information is propagated to said peer chassis access server via a communication path associated with said multi-chassis peering, wherein said communication path has associated with it an IP or other address specific to the multi-chassis peering;
wherein said propagating the new or updated information about the subscriber host to a peer chassis access server is not performed if the new or updated information with respect to the subscriber host is received from a peer chassis access server of the multi-chassis peering.

12. The network provider equipment of claim 11 further comprising a second communication interface associated with the subscriber host.

13. The network provider equipment of claim 11 configured to store the new or updated subscriber host information.

14. A computer program product for managing subscriber information, the computer program product being embodied in a computer readable medium and comprising computer instructions for:
receiving, at a first access server, a new or updated information about a subscriber host;
determining whether the subscriber host is associated with a multi-chassis peering including multiple peer access servers each configured to provide the subscriber host access to network service(s); and
in the event it is determined that the subscriber host is associated with a multi-chassis peering including multiple peer access servers each configured to provide the subscriber host access to network service(s), configuring the first peer chassis access server with a tag or other identifier associated with the multi-chassis peering to associate with a communication port with which the subscriber host is associated, and propagating the new or updated information to a peer access server associated with the multi-chassis peering;
wherein said subscriber host information is propagated to said peer chassis access server via a communication path associated with said multi-chassis peering, wherein said communication path has associated with it an IP or other address specific to the multi-chassis peering;
wherein said step of propagating the new or updated information about the subscriber host to a peer chassis access server is not performed if the new or updated information with respect to the subscriber host is received from a peer chassis access server of the multi-chassis peering.

* * * * *

UNITED STATES PATENT AND TRADEMARK OFFICE
CERTIFICATE OF CORRECTION

PATENT NO. : 7,865,576 B2
APPLICATION NO. : 11/712577
DATED : January 4, 2011
INVENTOR(S) : Regan et al.

Page 1 of 1

It is certified that error appears in the above-identified patent and that said Letters Patent is hereby corrected as shown below:

Column 7, Claim 6, Line 29:
delete "tile" replace with -- the --
Column 7, Claim 7, Line 32:
add -- a -- after with
Column 8, Claim 11, Line 7:
add -- access -- after peer Signed and Sealed this
Twenty-fifth Day of December, 2012

David J. Kappos
*Director of the United States Patent and Trademark Office*